US006250237B1

(12) United States Patent
Licht

(10) Patent No.: US 6,250,237 B1
(45) Date of Patent: *Jun. 26, 2001

(54) METHOD FOR USING TREE CROPS AS POLLUTANT CONTROL

(76) Inventor: Louis A. Licht, 9 Norwood Cir., Iowa City, IA (US) 52245

( * ) Notice: Subject to any disclaimer, the term of this patent is extended or adjusted under 35 U.S.C. 154(b) by 0 days.

This patent is subject to a terminal disclaimer.

(21) Appl. No.: 08/728,311

(22) Filed: Oct. 9, 1996

Related U.S. Application Data

(63) Continuation-in-part of application No. 07/650,453, filed on Feb. 4, 1991, now Pat. No. 5,947,041.

(51) Int. Cl.⁷ .................................. C02F 3/32; B09B 1/00
(52) U.S. Cl. ...................... 111/200; 111/900; 47/DIG. 3
(58) Field of Search ........................ 111/100, 101, 111/102, 200, 900; 134/25.1, 10; 210/150, 151, 602, 611, 617; 47/DIG. 3; 905/128

(56) References Cited

U.S. PATENT DOCUMENTS

| 4,529,497 | * | 7/1985 | Watson et al. ...................... 208/11 R |
| 4,839,051 | | 6/1989 | Higa ..................................... 210/602 |
| 4,904,386 | | 2/1990 | Kickuth ............................... 210/602 |
| 4,970,000 | | 11/1990 | Eppler et al. ........................ 210/903 |
| 4,995,969 | | 2/1991 | Lavigne ............................... 210/602 |
| 5,011,604 | | 4/1991 | Wilde et al. ........................ 210/602 |
| 5,078,881 | | 1/1992 | Augustine et al. .................. 210/602 |
| 5,127,963 | * | 7/1992 | Hartup et al. ....................... 134/26 |
| 5,303,871 | * | 4/1994 | Bateson et al. ..................... 241/20 |
| 5,376,182 | * | 12/1994 | Everett et al. ..................... 134/25.1 |

FOREIGN PATENT DOCUMENTS

| 3423226 A1 | 12/1985 | (DE) | ................................... 210/602 |
| 53-63762 | 6/1978 | (JP) | ................................... 210/602 |
| 58-70891 | 4/1983 | (JP) | ................................... 210/602 |
| 60-238198 | 11/1985 | (JP) | ................................... 210/602 |
| 701947 | 12/1979 | (SU) | ................................... 210/602 |
| 1289823 A1 | 2/1987 | (SU) | ................................... 210/602 |
| 1521383 A1 | 11/1989 | (SU) | ................................... 111/900 |

OTHER PUBLICATIONS

F.J. Molz et al., Transpiration Drying of Sanitary Landfills, 12 Ground Water 394–398 (1974).
R. Lowrance et al., Riparian Forests as Nutrient Filters in Agricultural Watersheds, 34 BioScience 374–377 (1984).
Adapting Woody Species and Planting Techniques to Landfill Conditions, EPA–600/2–79–128 (Aug. 1979).
E.F. Gilman et al., The Adaptability of 19 Woody Species in Vegetating a Former Sanitary Landfill, 27 Forest Science 13–18 (1981) (abstract, CAB Accession No. 810671175).
F.J. Molz & V.D. Browning, Effect of Vegetation on Landfill Stabilization, 15 Ground Water 409–415 (1977) (abstract, Biosis No. 000065026715).
H.A. Menser et al., Spray Irrigation–A Land Disposal Practice for Decontaminating Leachate from Sanitary Landfills, USDA SEA Agricultural Research Results, Northeastern Series (1979) (abstract, CAB Accession No. 811962022).
J.L. Schnoor & L.A. Licht, A Demonstration of Short Rotation, Intensive Cultured Poplar Tree Buffer Strips Grown for Biomass Energy Production and Water Quality Improvement, Leopold Center for Sustainable Agriculture Competitive Grant (1988).

(List continued on next page.)

Primary Examiner—Robert E. Pezzuto
(74) Attorney, Agent, or Firm—Zarley, McKee, Thomte, Voorhees & Sease

(57) ABSTRACT

A method of naturally removing or inhibiting pollutants. Tree stems are planted adjacent to or intersecting near surface ground water supply or adjacent a contaminated air source. The trees and rooted soil serve as a sponge and a pump to remove pollutants from water sources and serve as a buffer system to remove contaminants from air and polluted water sources. The system can also be used as a cap over landfills and brown fields to manage water.

25 Claims, 7 Drawing Sheets

OTHER PUBLICATIONS

M. Ettala, 17 Aqua Fenn 69–86 (1987) (abstract, Biosis No. 000085095126).

M. Ettala, 18 Aqua Fenn 3–14 (1988) (abstract).

V.N. Dennington et al., 16 J. Environmental Management 241–260 (1983) (abstract, CAB Accession No. 840692285).

E. Hubener, Water Water Disposal Areas in Forests: A Contribution to Safeguarding the Environment, 23 Sozialistische Forstwirtschaft 210–211, 220 (1973) (abstract, CAB Accession No. 740613540).

H. Nishizono et al., 34 Eisei Kagaku 546–549 (1988) (abstract, Biosis No. 000087097495).

Y.Z. Kulagin & S.A. Sergeichik, Gas Accumulating Function of Woody Plants, Ekologiya 9–14 (1982) (abstract, Biosis No. 000077038410).

Y. Shitkei, 23 Gorskostop Nauka 93–96 (1986) (abstract, Biosis No. 000083069838).

P.S. Pasternak, Using Forests as a Means of Environmental Protection, Lesovodstvo i Agrolesomelioratsiya (No. 60) 7–100 (1981) (abstract, CAB Accession No. 840695436).

S.A. Sergeichik, Biological Cleansing of the Air and Comparative Phytotoxicity of Sulphur Compounds, Byulleten' Glavnogo Botanicheskogo (No. 114) 24–28 (1979) (abstract, CAB Accession No. 800662697).

T. Keller, Filtering Effect of Hedges on Air–pollutant Dusts Created by Road Traffic, Especially Lead Compounds, 125 Schweizerische Zeitschrift fur Forstwesen 719–735 (1974) (abstract, CAB Accession No. 740619436).

H.M. Il'kun & M.O. Makhovs'ka, Removal of Lead Compounds from the Air by Plants, 35 Ukrayins'kyi Botanichnyi Zhurnal 246–248 (1978) (abstract, Biosis No. 000067018321).

E.A. Hansen et al., Irrigation of Intensively Cultured Plantations with Paper Mill Effluent, 63 Tappi 139–143 (1980) (abstract, WRA No. 8101094).

J.C. Sutherland et al., Irrigation of Trees and Crops with Sewage Stabilization Pond Effluent in Southern Michigan, in Wastewater Use in the Production of Food and Fiber–Proceedings 295–313 (1974)(abstract, WRA No. 7603560).

Z. Tihanyi, Utilization of Waste Waters by Fast–growing Tree Species, Acta Facultatis Forestalis, Hungary (No. 3) 27–38 (1984) (abstract, CAB Accession No. 890635325).

A. Bytnerowicz et al., The Air Pollution Accumulation Capabilities of Some Tree Species in the Vicinity of the Chemical Plant in Torun, 33 Bocznik Ssekcji Dendrologicznej Polskiego Towarzystwa Botanicznego 15–28 (1980) (abstract, CAB Accession No. 801368477).

K.E. Armolaitis, The Role of Horticultural Shelterbelts in Reducing Environmental Pollution, Lesnoe Khozyaistvo (No. 8) 33–35 (1986) (abstract, CAB Accession No. 870614942).

J. Supuka, Barrier Properties of Woody Plants Against Industrial Dust, vol. 3–4 Acta Dendrobiologica 247–297 (1980/1981) (abstract, CAB Accession No. 870617624).

L.P. Kapel'kina, Use of Willows for Stabilization of Sandy Industrial Wastes under the Conditions of the Kola Peninsula, Lesovodstvo, Lesnye Kul'tury i Pochvovedenie (No. 10) 96–100 (1981) (abstract, CAB Accession No. 840696454).

Z. Tihanyi & K. Tompa, Role of Poplar and Willow in Sewage Purification, Proceedings of the 11$^{th}$ Int'l Congress on Agricultural Eng'g 333–337 (1989) (abstract, CAB Accession No. 900639572).

*Organic Gardening*, Nov. 1989 "Taking Hardwood Cuttings", pp. 26–27.

*Successful Farming*, Feb. 1990 "Dollars From Filter Strips", pp. 36–37.

Selected abstracts from PTO database search, including "Nitrogen Fixing Research Reports 1988", concerning root initials and depth of planting.

Selected abstracts from PTO database search concerning filter strips, Nov. 1992.

\* cited by examiner

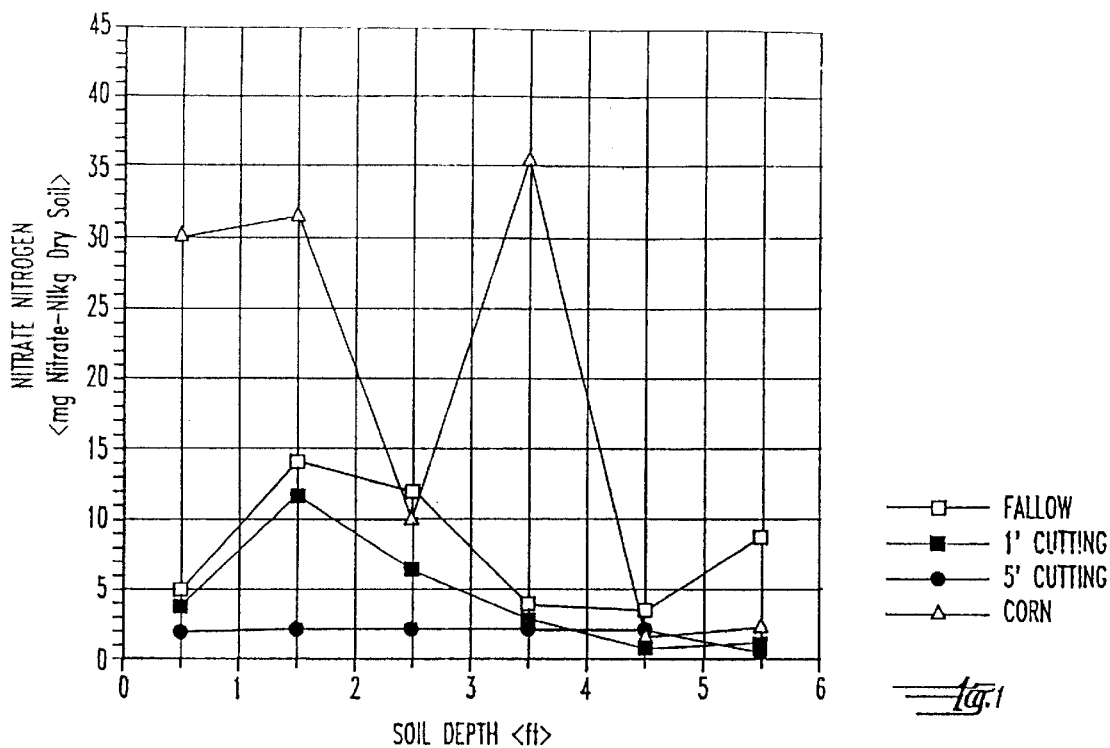
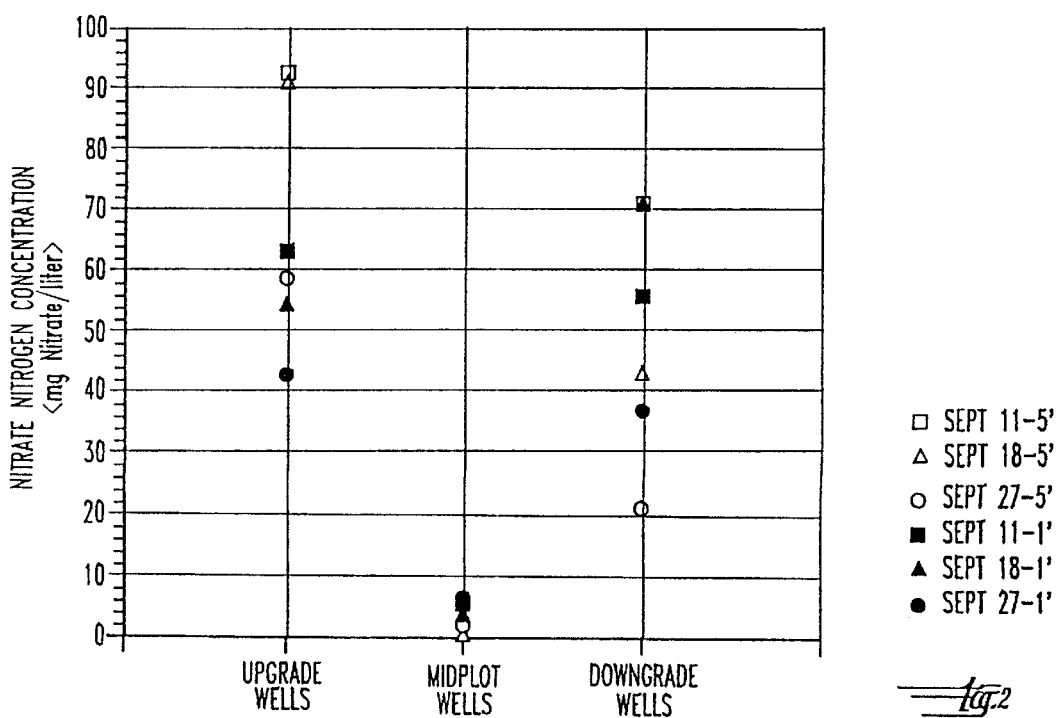

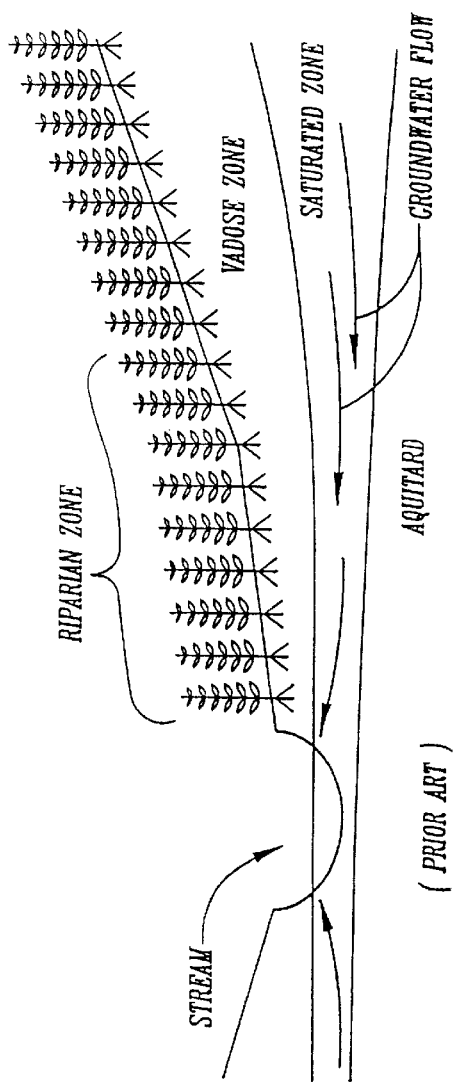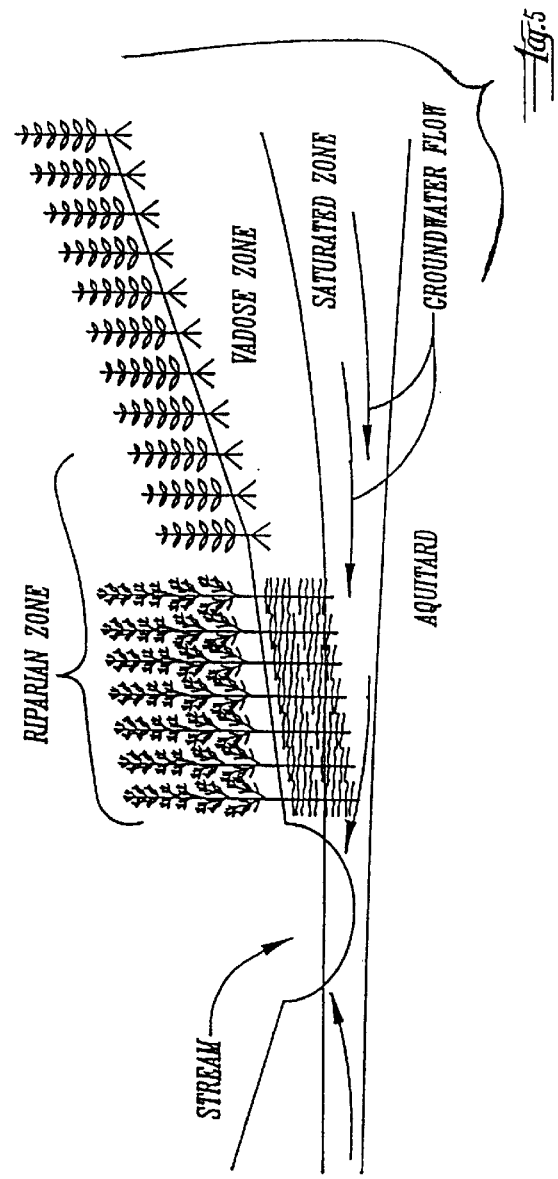
fig.5

PLANTING TECHNIQUE
| 5.5' CUTTING | 5' DEEP TRENCH | 5' DEEP ROOTING |
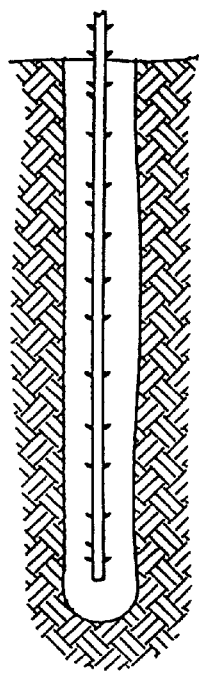
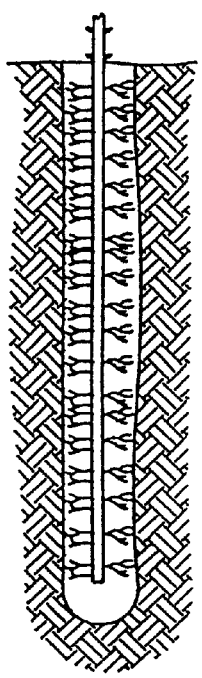
Fig. 6

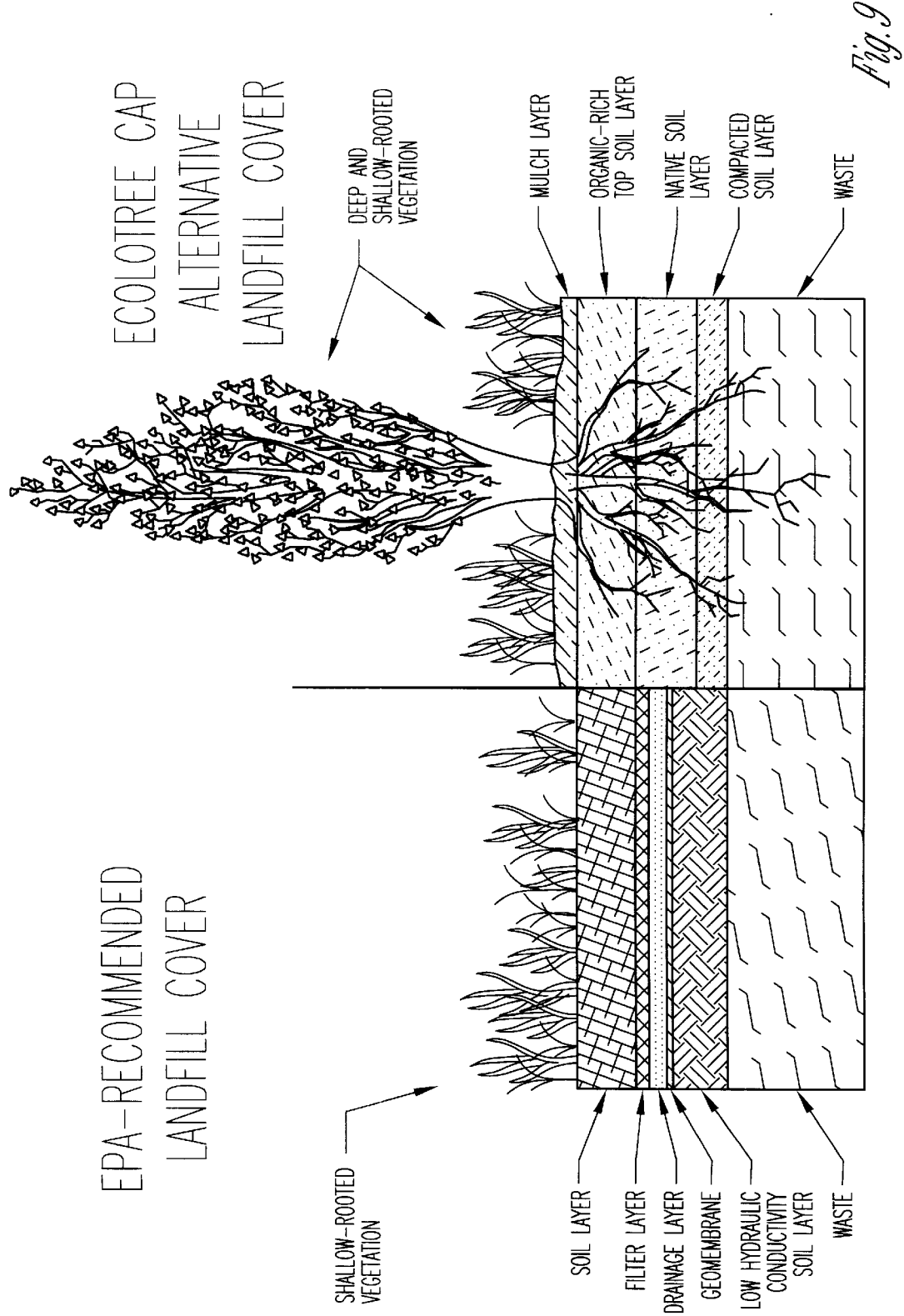

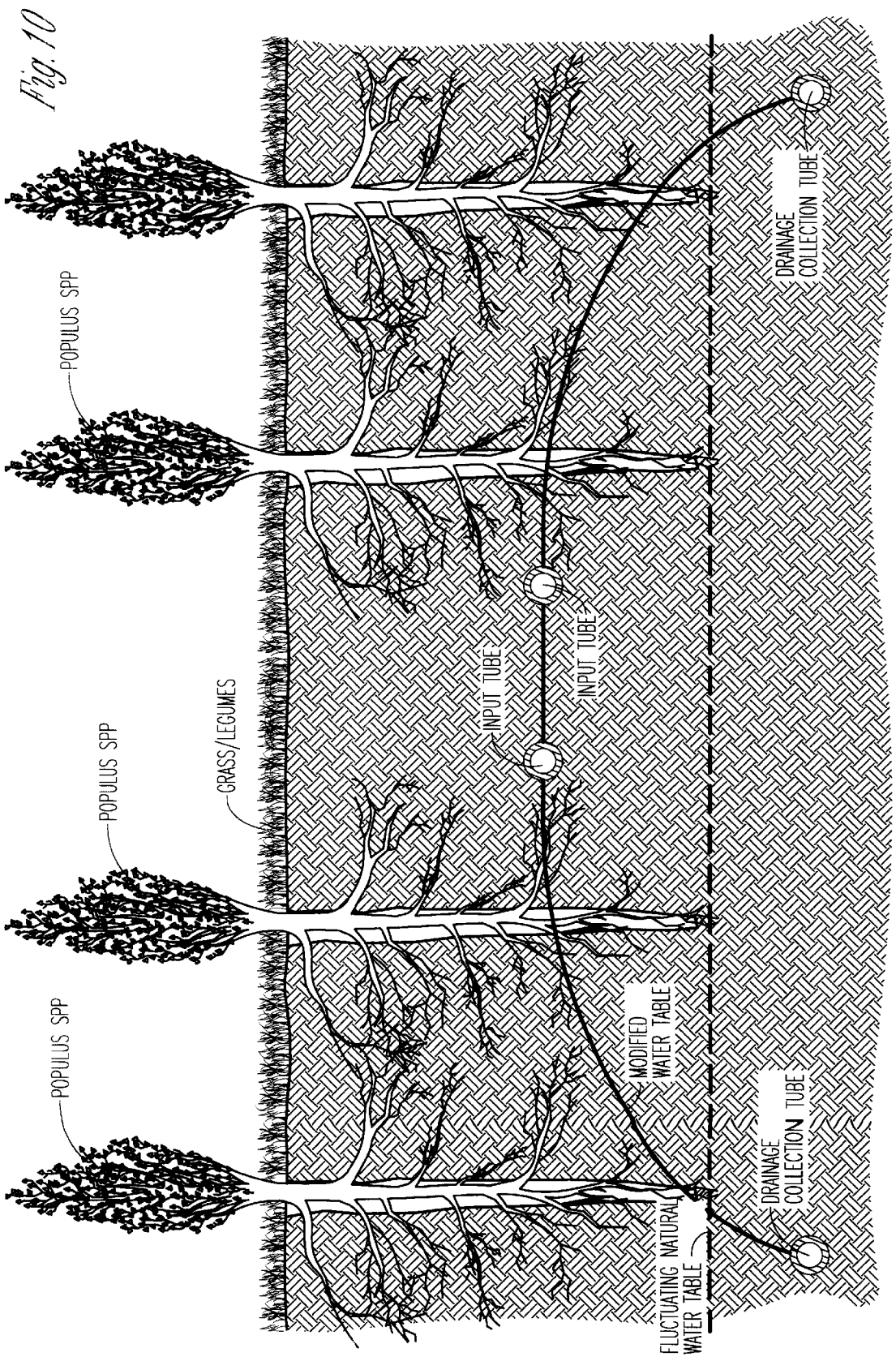

METHOD FOR USING TREE CROPS AS POLLUTANT CONTROL

CROSS-REFERENCE TO A RELATED APPLICATION

Continuation-in-part of application Ser. No. 07/650,453 filed Feb. 4, 1991, now U.S. Pat. No. 5,947,041.

BACKGROUND OF THE INVENTION

Over the years there has arisen increasing concern on the part of scientists, environmentalists, and the general public as to the condition of our environment, and the adverse impact that humans have had upon it. Some of this concern has been directed toward the destruction of forests and trees which provide oxygen for our atmosphere, and toward the introduction of environmental pollutants, especially those entering surface water and eventually drinking water supplies. Pollutants can be from point sources, like a pipe, or they can be non-point sources such as runoff from fields or diffuse leakage from landfills or septic systems. Non-point source pollutants are currently a major source of contamination of American drinking water. A number of pollutants enter waterways as a result of the use of chemicals on crop land. This is especially true of nitrate-nitrogen and phosphorous used as fertilizers on crops. In agricultural states such as Iowa for example, nitrate-nitrogen is the number one pollutant of drinking water exceeding EPA-defined drinking water standards. The nitrogen fertilizers are but one of a number of chemicals that are injected in or on the soil or sprayed on crops, and then enter the near surface ground water and travel to nearby streams and therefore ultimately may reach drinking water supplies.

Once in the drinking water supply, the most commonly used method of removing such pollutants is to treat the water at treatment plants before it is presented to the general public. Often such treatment is not done due to expense for nitrate removal, resulting in public exposure of nitrate-nitrogen in the drinking water supply. This is only one example of the numerous pollutants which can enter ground water supplies causing contamination.

At the same time, conservationists seek to prevent the destruction of forests since trees provide, among other benefits, carbon dioxide uptake and oxygen production for our atmosphere as well as wildlife habitat, erosion control, and wind shelter. A variety of measures have been taken to try to encourage the planting of trees in order to obtain these advantages. However, in times of economic distress and cuts into governmentally supported conservation programs, it can be difficult to provide incentives for using valuable land to grow trees.

This invention is related to solving each of these problems in a unique and holistic way. It provides for a natural means of removing pollutants, or stabilizing such pollutants, in order to prevent them from traveling through the near surface ground water to nearby streams and ultimate drinking supplies. It does this by using particular types of trees planted in a particular manner, as below described, in order to achieve maximum removal of pollutants from near surface ground water with minimum but strategically located tree buffers. Trees have not played a major role in the management of water, air, and soil pollution caused by people, primarily because most trees grow too slowly in their early life to be used effectively for this purpose.

In addition to removing environmental pollutants, the trees may be used as a harvestable crop, providing, among other products, a renewable source of fuel, lumber, pulp, paper, or industrial chemical feed stock. This crop value provides to the land owner a quicker return on the investment of setting aside land for a tree buffer strip. By using this natural means of removing pollutants, one additionally achieves the advantages of providing a wildlife habitat, soil stabilization, a wind buffer, a sink for carbon dioxide, and a source of oxygen for the atmosphere, to say nothing of the visual enhancement provided by trees.

The method described here selects for trees with pre-formed root initials (members of Salicaceae family) capable of growing roots to prescribed depths; and, the manner of planting employed allows an extensive root system to reach very deep levels within the soil. In this manner, an extensive root system can reach down to the near surface ground water, and in fact grow beneath the water table (phreatic surface).

The method employed allows extensive deep root systems to grow at such levels without dying. By pre-selecting the trees, buffer location, planting them in the manner described, and harvesting them as indicated, a natural and relatively passive method of pollutant removal is achieved while at the same time providing a renewable crop, and its own source of economic return.

Accordingly it is an object of the present invention to provide a natural means of pollutant removal from near surface ground water.

Another object of the invention is to provide a renewable, sustainable crop while removing or inhibiting pollutants.

Yet another object of the invention is to provide an economical means of pollutant removal or inhibition.

A still further object of the invention is to provide for a method of pollutant removal or inhibition which additionally provides environmental benefits.

Still further objects of the invention will become apparent in the following disclosure.

DESCRIPTION OF THE DRAWINGS

FIG. 1 is a graph showing average nitrate-nitrogen concentration in plot soils in fallow areas, areas with one foot tree stem cuttings, five foot tree stem cuttings, and areas where corn was grown.

FIG. 2 is a graph showing average nitrate-nitrogen concentrations in the areas as indicated.

FIG. 5 shows a schematic buffer installation.

FIG. 6 shows a schematic planting method used for poplar cuttings.

FIG. 9 is a comparative illustration of the EPA-recommended landfill cover and the landfill cover in accordance with the present invention.

FIG. 10 shows a schematic buffer installation for waste water treatment.

SUMMARY OF THE INVENTION

Figure 3:
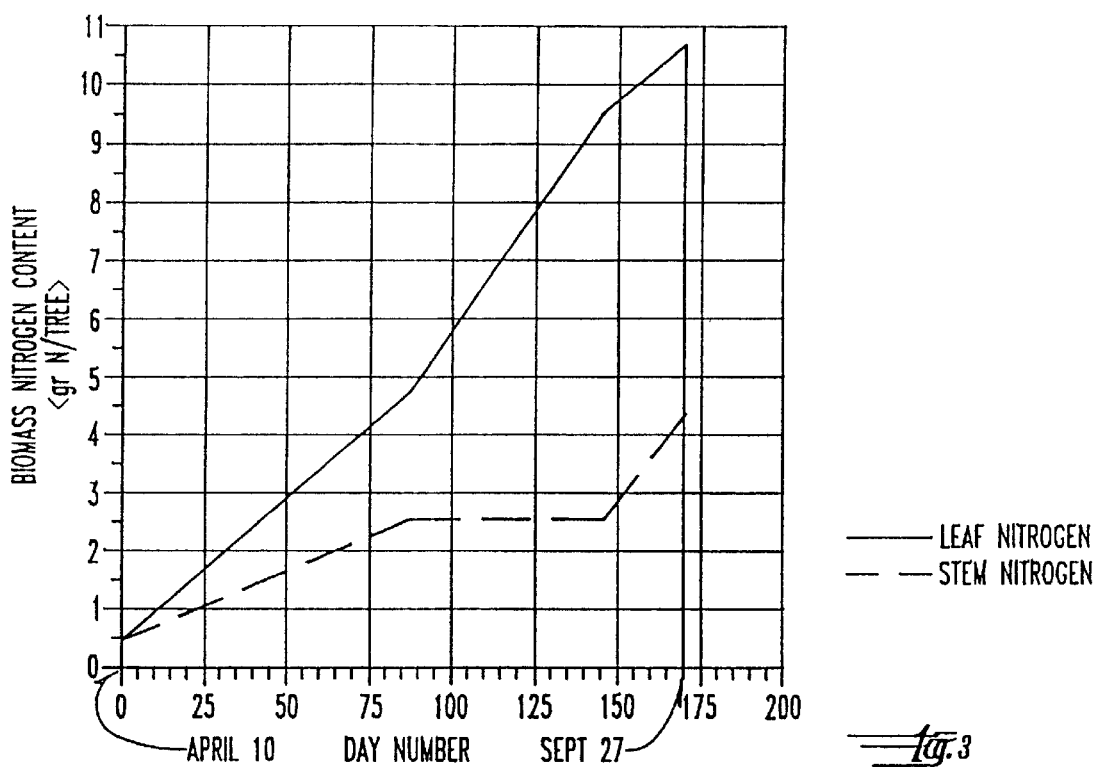
FIG. 3 shows stem and leaf mass per tree planted with one foot stem cuttings.

The invention relates to an ecological "cap" which acts as a "sponge and pump" to reduce water movement through buried wastes or chemical leaks, thus removing organic priority pollutants while rejuvenating a raw ecosystem. The invention can also be used as a water filter to absorb and remove toxic anions, cations and organic molecules from near surface soils and ground water.

The invention includes a thick cover of soil and soil amendments deeply rooted with trees that act as a "sponge" to hold water and organic matter in soil pores. The surface cover stores water within the root zone. This surface cover increases water holding capacity and infiltration rate of amended surface soils in order to quickly absorb large amounts of rainfall and gradually release the water to the roots which reduces water infiltration and subsequent leachate production. This same installation technique can also be used to absorb pollutants applied via irrigated water through surface and subsurface application systems. This allows filtration of pollutants from waste water treatment plants.

Trees in the Salicaceae family Populus spp. and Salix spp. are planted within the surface cover. The trees selected are capable of regrowth from stumps (coppicing) and are capable of fast wood growth with significant nutrient and water uptake. The trees are planted deep into the soil at targeted depths where the near-surface ground water is located. These trees are planted along with grasses and legumes which send roots into the landfill cover soil. These roots then act as a "pump" that removes the water from the soil and then transpires the water through leaf Stomata back into the atmosphere.

The sponge and pump system of the present invention provides sufficient tree density and root development to transpire water taken up by the roots at a sufficient rate to prevent or greatly reduce infiltration of water into the designated waste area, such as a landfill or chemical spill. Further, the present invention is useful for filtering waste particles and dust from the air, such as adjacent to livestock housing and manure management facilities to reduce the amount of odorous particles. It is also useful for absorbing toxic anions, cations and organics from septic systems leach fields below the soil surface.

Because of the type of tree stem cuttings selected, there is fast regrowth in order to maintain the environmental and economic benefits. The crop itself is used in any one of various products, and may be used, for example, as a renewable fuel source.

DETAILED DESCRIPTION OF THE INVENTION

This invention achieves a number of different goals and does so by selecting a particular type of tree, and planting it in a particular manner, as well as harvesting the tree as a crop on a regular basis. By the method which is described here, one can remove or inhibit pollutants from the air and near surface ground water and waste, and do so with an economically viable renewable crop, while also providing a number of environmental benefits such as wildlife habitat, wind shelter, soil stabilization, and other related benefits.

In order to achieve this goal, it is necessary to select a tree to be planted which is capable of extremely deep root growth, and which has an extensive root system. The tree selected must have a perennial root system in order to have maximum early spring water and pollutant uptake. The tree selected must have preformed root initials below their bark for deep root establishment. As a result of having such preformed root initials, the tree stem cutting will form roots the entire buried length of the stem. This provides for root purposely placed to desired soil depth near the ground water table and effect nutrient and water uptake and maximum root network within the soil. FIG. 5 (top portion) shows a conventionally row cropped riparian zone with the bottom portion showing a deep rooted riparian buffer. FIG. 6 shows the method used to grow roots (150 cm) deep in the soil profile.

It is also preferred that the tree selected, in order to obtain the maximum benefits, has fast wood and leaf growth in order to quickly replace that which has been harvested; is capable of cut stem rooting for faster root growth at desired soil depths; and is capable of resprouting form a stump in order to maintain the present root system, for fast regrowth, and to decrease effort expended in replanting after harvesting. Fast wood and leaf growth also results in improved ammonia nitrogen, nitrate-nitrogen, and phosphorous uptake, and improved water uptake with a larger mass of water removed from the soil. Trees which have a high protein content in the leaves also provide for improved crop value as livestock feed. Poplar, sycamore and willow trees are examples of such trees.

The poplar trees, in addition to having preformed root initials, have all of the advantages which are listed. It has a fast wood growth rate, as measured in terms of biomass matter grown per square foot of soil surface. The rate of growth for a poplar average 0.5 pounds of biomass dry matter per square foot per growing season. This can be compared to corn, which is considered to be an annual plant with a fast growth weight, and has a rate of 0.33 pounds of biomass dry matter per square foot per growing season. Trees which have fast growth rates are very effective in using sunlight, water, and carbon dioxide to grow biomass. A tree which is 50% faster in such growth rates as compared to corn is considered to have an excellent growth rate. Poplar and willow trees are the most preferred trees to be used in this method.

Tree roots from these selected species are then intentionally grown to depths that intersect the near-surface water table. It is difficult to culturally control rooting depth when planting a seed or short plant cutting. By using trees having preformed root initials, root sprouting from the entire planted stem's buried length is possible. Unrooted tree stems may also be planted, however. By planting the cutting deeply and densely, one can get extremely deep root growth and control the root growth achieved (see FIG. 6).

The cuttings are preferably planted so that at least two viable buds are showing above the ground. The cutting must be planted at least adjacent the ground water. It is possible to plant it more shallowly so that it does not actually begin growth adjacent the water table when first planted.

The length of the cutting will vary depending upon the area selected for planting, and the location of the ground water table. Preferably, the cutting is placed so that at least two viable buds are showing above ground. Also, preferably at least ten inches of the stem is in the ground.

As a result, roots will develop along the entire planted depth within a short time of planting. The presence of living roots along the entire submerged cutting depth allows significant root surface for nitrate-nitrogen and other pollutant uptake from near surface ground water. Additionally, the extensive root system also provides for vastly improved soil stabilization, and will inhibit the movement of soil sediment along with other pollutants.

It was the surprising result in employing this method that the rooting depth was predictable and root vigor occurred at and below the water table. It had been expected that the root system could not survive at these levels. But, by selecting these particular types of trees, and planting them in this manner, they not only were viable but continued to grow extensively, resulting in nearly total removal of nitrate-nitrogen and related pollutants from the ground water through its extensive root system.

The trees should be planted at depths which range from 6" to 18" deep using a ripper, and 18 inches to seven feet deep via trenching equipment allowing said trees to develop root systems that remove water, nutrients, and targeted pollutant compounds from the planted soil.

In achieving the goals of the invention, it is also necessary to plant the cuttings densely. By planting the trees densely, one is able to achieve significant nitrate-nitrogen and other pollutant uptake and inhibition in the first three years of establishment. Further, the related environmental benefits are also enhanced by such dense planting. Dense planting provides for improved wind break, wildlife habitat and inhibition of soil erosion. When planted very closely together, it is possible that the trees may have some stunted growth because of the lack of room to expand; in future years tree thinning may be required for optimum performance. The best benefits have been obtained by planting the trees at a density of 10 ft.$^2$ per tree to 30 ft.$^2$ per tree. The most preferred density which has been found is approximately 30 ft.$^2$ per tree. At this density, it is possible to achieve a goal of 400 lbs. of nitrogen uptake per year by the third growing season. Planted too far apart, and the environmental effects will be reduced, and nitrate-nitrogen uptake diminished. Planting at greater than 40 ft.$^2$ per tree results in a decrease of these benefits.

In seeking to achieve the goal of providing for a harvestable crop, the trees are preferably planted in rows sufficient to allow tractors and other farm equipment to be used for cultivation of the crop. The exact dimensions used are not critical, as long as the equipment can sufficiently maneuver for practical usefulness in cultivation.

The area where the crop is to be planted will vary depending upon the exact goal which is to be achieved. Two primary locations of placement include on top of a landfill or a brown field to be treated to act as a cap or, the crop may be placed adjacent to a source of polluted water such as near a leachate lagoon or water treatment plant.

Grading the site is not critical as long as ponding does not occur, but some slope will facilitate winter runoff when soil is frozen and during major storms.

The present invention manages precipitation that falls on land fills and other contaminated spaces using a "sponge and pump" concept to control infiltration and reduce subsequent seepage. The present invention is a crop system that is managed and valued as a polluted water treatment system. However, the crop is not managed only for biomass yields, like corn or wheat. Its foremost value is its ability to pump water while rejuvenating a juvenile ecosystem.

The invention's sponge-pump components include a thick cover of soil and soil amendments (such as compost, ground wood, chopped paper, digested sewage sludge, lime sludge, manure, paper mill waste, and other organic biomass) that act as a sponge to hold water and organic matter in soil pores. The surface soil stores water within the root zone. Adding a layer of organic matter approximately doubles water holding capacity and infiltration rate of amended surface soils. The increased infiltration rate allows the organic matter layer to quickly absorb large amounts of rainfall and gradually release the water to roots which reduces water runoff and infiltration, thus functioning as a "sponge". This dewatering process in conjunction with pore spaces in the soil provides water storage capacity.

Trees, grasses and legumes send roots into the landfill cover soil. Through cellular respiration, these plants absorb water from the soil, thus functioning as a pump. If the root zone is deep enough and has sufficient water storage capacity, and if plants grow fast enough to dewater the soil, little water will percolate below the root zone. Poplar trees and grass have the capacity to take up sufficient amounts of water to use all of the annual precipitation. Plant uptake, driven by solar-powered photosynthesis, removes water and nutrients from root zones that reach depths greater than 1.5 m (5 ft) in upland soils.

Thus, the cap is designed to prevent water from entering the landfill area in two ways. First, the leafy canopy and ground cover intercept and evaporate precipitation before it reaches the soil surface. Second, the fast-growing trees develop a dense, deep rooting system that takes up soil moisture and transpires the water back to the atmosphere through leaf Stomata before it percolates through the root zone.

The invention also functions to remove odors and nuisance particles from the air. The trees should be placed adjacent to the contaminated air source since the location of the trees in relation to the particle source and method of air delivery into the tree buffer will influence particle interaction.

Furthermore, the invention is useful for removing anions, cations and organics, including $NH_4^+$ and $PO_4^{---}$, from waste water and sewage treatment plant effluent, which include public, industrial, and community septic systems wherein waste water is discharged through surface irrigation or pipes below the soil surface. As water containing soluble or particulate pollutants flows through the tree roots, the roots uptake and utilize the nutrients and adsorb trace organic compounds. These cations and trace organic compounds are adsorbed to clay and organic surfaces. The filtered water then moves to drainage lines or deeper ground water. FIG. 10 is a schematic of a buffer installation for sewage and waste water treatment.

Salix spp. (willow) has a narrow elongated leaf while Poplar has a rounder, larger leaf. Both trees are candidates for the present air filtering system. It is the structure of the leaf and stem that provide the surface for odorant and particle adhesion. Once adhered, the particles will wash off during a rain or by water irrigation and become soil nutrient amendment. Odorous materials such as manure aerosols and particles can be removed from the environment in this manner.

In addition, the method of the present invention may also be used for removing or containing organic priority pollutants, such as those arising from petroleum spills, pollution from herbicide manufacturing plants, munitions locations, petroleum manufacturing sites, wood treatment sites, etc. The area above and adjacent to the pollutant may be trenched 4–12" wide at depths from 1–6' and backfilled with clean soil and organic amendments. Trees are then planted within the trench. This in turn reduces surface erosion into the surface water and further reduces wind-blown particle movement. Furthermore, the trees provide a ready-available carbon source to feed microbes which aid in microbial degradation. The trees themselves produce enzymes and other chemicals which react and detoxify the spilled chemicals.

Fast growth corresponds to large water and nutrient uptake capacity. Poplar trees' roots can be induced more than six feet into soils and waste removal has been measured more than eight feet below the surface. The plants evapotranspire water back to the atmosphere, take up nutrient elements and convert them to organic molecules like cellulose and proteins, and add carbon to the soil that helps adsorb. They then decompose organic chemicals, such as herbicides, from the soil.

The U.S. Environmental Protection Agency (EPA) has approved clay or geomembrane as covers for buried waste or contaminated soils. These low permeability layers are designed as a "raincoat" barrier, causing precipitation to runoff and with slight regard for plant growth. The EPA scheme actually facilitates precipitation run-off. FIG. 9 is a comparative illustration of the EPA-recommended landfill cover versus the landfill cover of the present invention.

In contrast, the present invention focuses on protecting ground water quality and reducing leachate formation by re-establishing a vigorous ecosystem that uses or stores water in the root zone. The poplar/grass plant system grows faster than most alternative crops and has the capacity during the growing season to evaporate and transpire more water than just what falls by precipitation.

When survival, growth rate, and rooted soil depths can be predicted, the transpiration of water can also be predicted. As a conservative estimate, plants remove 600 pounds of water from the soil pores for every pound of stem drying matter growth. When transpiration exceeds rainfall, plants remove stored water from the rooted cover soils. This dehydrating action effectively gives the cap a water storage capacity to retain water during winter dormancy and hold a large fraction of late fall and early spring infiltration into the root zone.

The present invention does more than just manage water. For instance, unlike a synthetic membrane cover that may crack, rip or tear, the dense plant root system grows into a cover that flexes during differential settling, flooding, free/thaw cycles, drought, water table fluctuation, or subsurface gas formation. The cap is porous, so it does not bubble up or float and does not require a venting system.

The dense yard debris compost mulch and clover/grass cover crop creates a mat of vegetation that reduces wind blown dust and water erosion. Annual leaf fall adds to the mulch and continues to increase water holding capacity. The porous tall edge intercepts blowing waste particles, creates a natural noise barrier, screens the view from neighbors and provides a wind break for the operator. The dense planting prevents falling leaves from blowing off the site.

The forest that is created more closely matches the natural landscape. The diversity of plants creates a mature wildlife habitat by providing cranial cover, home sites and food sources. Plant diversity minimizes the loss of non-game wildlife species that depend on field edges for habitat. In addition, the trees provide wood fiber that can provide biomass fuel, paper pulps, furniture, and building material.

A potential use of the present invention is for closure of ash ponds which are produced by power plants, for example. Fly ash and bottom ash are by-products of coal combustion and power generation at power plants. Fly ash is scrubbed from exhaust gas and is about the size of a silt particle. Bottom ash is more granular and has larger particles. Typically, up to 60,000 tons of ash can be produced annually. Normally, sluice water carries the ash from the plant to an ash pond where the ash then settles out of the water and collects in the pond. Due to limited storage capacity, ash ponds cannot be used indefinitely as these plants.

The cap manages precipitation falling on the fly ash pond surface by controlling infiltration and reducing seepage of water through the tree root zone. The root zone acts as a sponge to temporarily store precipitation, and then fast-growing poplar trees pump the water out of the root zone through the natural respiration process. The site's annual evapotranspiration will consume the total annual precipitation by the third growing season.

Mulch and the grass/clover ground cover results in a dense, rooted mat that reduces the potential for water erosion. Leaves dropped in winter further armor the soil surface and minimize erosion.

The mulch and the grass/legume ground cover also reduce the wind-blown ash. The mature trees provide additional reduction in wind-blown ash by reducing wind velocities on the ground. The mulch and the grass/clover ground cover, along with the rooted trees and annually increasing leaf mat reduce the potential for erosion of the cap. The cap of the present invention can be installed over ash ponds to provide closure, minimize leachate production, and to achieve the closure requirement now being faced at these plants while providing all of the advantages of the cap as described above.

Prior to planting the trees of the present invention, mineral fertilizers, compost or livestock manure must be added to the waste material to maintain adequate nutrients in the final amended cover soils. Conducting agronomic and forestry soil nutrient analyses every spring will provide the data for gauging the kind and amount of fertilizer needed. Foliar analyses also should be performed during the growing season to determine the plant actual elemental uptake. Table 1 shows the recommended nutrient requirements for poplar.

TABLE 1

Recommended Soils Analysis Guidelines for Poplar Plantations
(Expressed as parts per million- ppm × 3.6 = pounds per acre ft.)

|  | Very Low | Low | Medium | High | Very High | Base Cations |
|---|---|---|---|---|---|---|
| NO$_3$—N | 5 | 15 | 35 | 50 | 60 |  |
| NH$_4$—N | 3 | 5 | 20 | 30 | 40 |  |
| Phosphorus | 3 | 5 | 20 | 40 | 50 |  |
| Potassium | 50 | 150 | 400 | 500 | 600 | 2–6% |
| Calcium | 1000 | 1400 | 2000 | 4600 | 3800 | 65–80% |
| Magnesium | 300 | 350 | 400 | 450 | 475 | 10–20% |
| Sodium | 50 | 100 | 150 | 250 | 375 | <5% |
| Zinc | 0.3 | 0.5 | 1.5 | 1.8 | 2 |  |
| Iron | 2 | 4 | 9 | 14 | 35 |  |
| Manganese | 1 | 2 | 5 | 7 | 9 |  |
| Copper | 0.3 | 0.5 | 1 | 1.5 | 2 |  |
| SO$_4$—S | 6 | 15 | 20 | 40 | 60 |  |
| Boron | 0.4 | 0.6 | 0.8 | 1 | 1.2 |  |
| pH | 6 | 6.6 | 7 | 7.5 | 8 |  |

While these are the preferred amounts and types of soil components, they are not meant to limit the present invention since various other nutrient combinations and soil compositions will also be operable to achieve the invention's goals and objects, as can be appreciated by those of ordinary skill in the art.

Examples of possible sources of soil amendments include composted yard waste, raw yard waste, wood chips, sewage sludge, manure, biological sludge, and industrial sludge. If yard waste is used, the preferred depth of amendment is from 0.5–2.0 feet. Wood chips can also be added between tree rows throughout the life of the cap.

The next step is to plant the rooted or unrooted trees of the Salicaceae family. The trees should be planted at depths which range from 6 inches to 18 inches deep and up to 6 feet via trenching equipment. Three examples of prototype planting schemes are as follows:

1. 13 inch unrooted cutting at a spacing of 20 feet and density of 2,170 trees per acre;
2. 48 inch+unrooted "width" at a spacing of 30 feet and density of 1,450 trees per acre; and
3. 1 year old bare root tree at a spacing of 30 feet and a density of 1,450 trees per acre.

These schemes allow tractor and truck access to every tree so that the trees can be maintained properly. The ability to add amendments, such as fertilizers, compost sledges and ash to the cap soils can be insured by allowing a minimum of 10 to 12 feet between rows to allow a small tractor to drive through. Trees should be planted north, south in north/south rows to minimize total shading of slower growing rows. Tree row spacing will alternate with 8 foot and 12 foot spacing to allow truck access in every other row.

The system must be designed and managed with the sponge-pump functions in mind. Irrigation helps to establish the young tree. However, the amount of water applied through irrigation must be controlled to insure that the soil has adequate capacity to store water from precipitation as well. If this capacity is exceeded, water will leach through the soil profile. Water uptake by the trees varies seasonally and drops off significantly during winter dormancy. It is important that irrigation also be scaled back in late summer to leave adequate soil moisture storage capacity for winter precipitation. In effect, the trees should be deficit irrigated to maintain this additional storage. Due to the rapid development of the trees, their water uptake increases greatly over the first three years of growth.

The present invention manages precipitation falling on the waste area surface by controlling infiltration and reducing seepage of water through the tree root zone. The root zone acts as a sponge to temporarily store precipitation and then fast growing poplar trees pump the water out of the root zone through the natural transpiration and evaporation process. For example, in Iowa an acre of poplar/grass will annually evapotranspire more than 36 acre inches—more than the total annual precipitation by the third growing season.

The cap also minimizes the potential for release of ash or other waste with surface runoff. Mulch and the grass/clover ground cover result in a dense rooted mat that reduce the potential for water erosion. Leaves dropped in winter further armor the soil surface and minimize erosion. The cap further minimizes the potential for airborne release of ash or other waste. The mulch and the grass/clover ground cover also reduce the wind blown ash. The mature trees provide additional reduction in wind blown ash by reducing wind velocities on the ground. Moreover, the mulch and the grass/clover ground cover along with the rooted trees in annually increasing leaf mat, reduce the potential for erosion of the cap.

The cap will be a robust agroforestry system that will function in the long term with minimal maintenance. After the initial 5 year maintenance program, the cap will mature into a forest of large poplar trees. Over time, the organic content of the upper soil horizon will continue to increase, enhancing the ability of the upper horizon to reduce or prevent deep perculation of precipitation. Since the cap has a greater resistance to subsidence and settling, there would be less long term maintenance in comparison to a synthetic cover as recommended by the EPA.

A dense plant root system grows into a cover that flexes and does not crack or rip as differential settling, splitting, freeze/thaw cycles, drought, water table fluctuations, or subsurface gas bubbles form that may tear synthetic membrane covers.

The following examples are submitted to illustrate a proposed prototype installation scheme for the present invention. They are not intended to limit the present invention in any way but are used merely for illustrative purposes.

EXAMPLE 1

Figure 7:
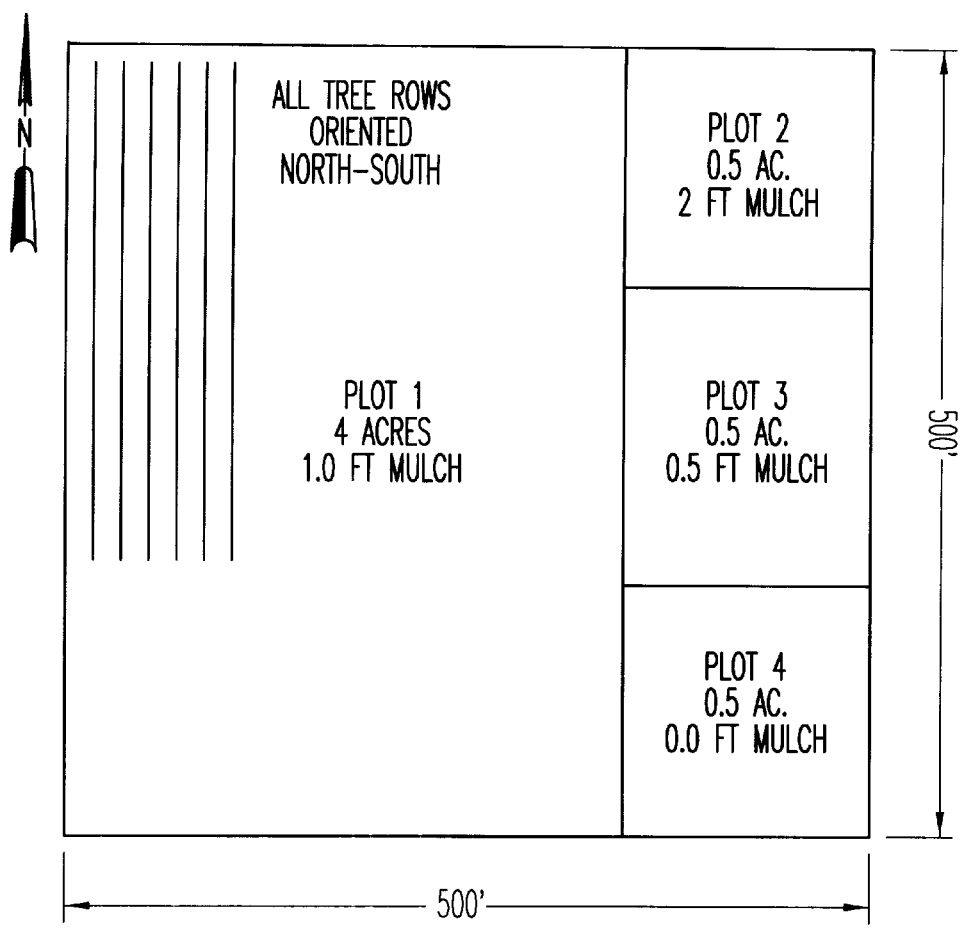
FIG. 7 shows a poplar tree cap demonstration site layout.
Figure 8:
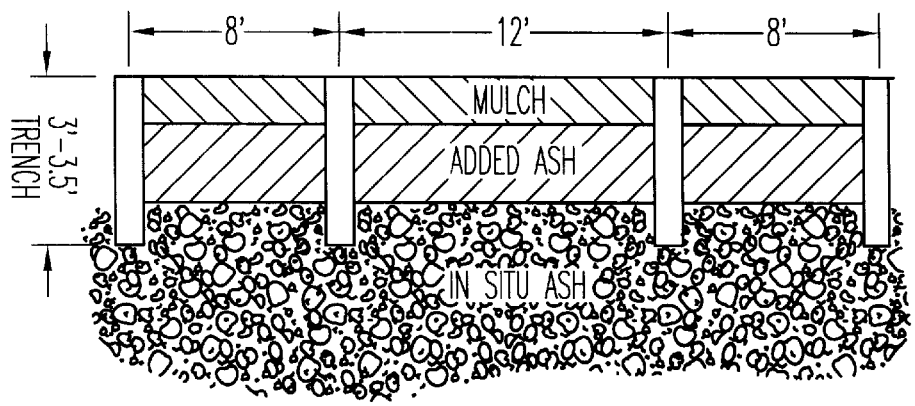
FIG. 8 shows a poplar tree cap demonstration site layout.

The prototype installation will involve the following steps. First, the site will be prepared including installation and grading the ash to slope specifications. Caps have been installed on slope ranging from 0 to 33%. The slope is not critical to tree survival and should be for the least cost. Prepare and apply the compost as shown in FIG. 7, graded to the desired depth in the four prototype plots. This will require an average of one acre foot of soil on the ash pond and the blank.

The site should next be prepared for planting which includes: 1) trenching the compost/ash cover for the desired row spacing; 2) adding fertilizer to the excavated soils to specified concentration; and 3) regrade the compost ash and fertilizer blend into the trenches.

The next step is to plant the trees including two clonal varieties, and three forms: 13 inch cuttings, 60 inch whips, and one year rooted stock; two year rooted stock may be used if the site is available for planting in early May. Next, regrade the site to slightly mound surface soils over the tree rows and then drill clover between the tree rows. An irrigation system should also be installed.

During the growing season, the site must be maintained including mowing, collecting plant and soil samples, and accessing end of season survival and growth. During the second growing season, fertilizer should be added, weeds and insects should be controlled, the trees should be pruned and replacement trees should be added if necessary.

EXAMPLE 2

(Ecolotree Buffer® Planted With Deep Roots Bordering Streams and Drainages)

Tree Plot Layout and Installation

The prototype buffer strip was installed May 17, 1988. The site selected for installation of the 1988 poplar tree buffer test plot was at the Amana Society Farms, Amana, Iowa. Farming of rotated crops occurred up to the creek bank edge with the 1988 crop being oats.

The total buffer test strip consisted of four adjoining plots running parallel to the creek, each measuring 3 m by 12 m (10 ft. by 40 ft.) in size. A 4.5 m (15 ft.) wide fallow strip was included as a drive for equipment and separated the trees from the creek. This planting plan is typical for riparian buffers; the land use is a long corridor that removes a relatively small portion of the farmland from commodity crop agriculture.

The initial planting density of poplars was 33,000 trees/hectare (13,000 trees/acre) for an area allocation per tree of 0.3 $m^2$/tree (3.3 $ft^2$/tree). Each plot had four rows planted with a between-row tree of 1 m (40 in) apart and an in-row tree spacing of 30 cm (1 ft). Plot #2 was planted with 1172 cuttings each 1.8 m (6 ft) long and planted 1.5 m (5 ft) deep as shown in FIG. 3. A trencher dug five-foot deep trenches parallel to the creek the 12 m (40 ft) width.

Plots were planted with 160 cuttings measuring 30 cm (1 ft) in length. The final poplar buffer strip was 3 m×120 m (10 ft×400 ft).

The field was tilled to a depth of 15 cm (6 in) to breakup the topsoil and remove all surface vegetation. The treed buffer strip bordered corn planted upgrade using conventional farming practices. Tree culturing practices included weeding using tractor or hoe tillage without the use of herbicides. No fertilizer was added to the soil both in the buffer strip or on the upgrade oat field during 1988. Corn was grown in 1989; anhydrous ammonia fertilizer was applied at the rate of 168 kg N/ha (150 lb N/acre) in March before the growing season.

Root Placement and Growth

Results from the first two growing seasons have demonstrated that Populus spp. cuttings rooted their entire buried depth when 1.8 m (6 ft) cuttings were planted to depths of 1.5 m (5 ft) in field plots. Roots grew from preformed roots initials located below the stem's epidermis which emerged the entire buried depth.

The tree root presence and the planting technique significantly impacts the soil profile. The 1 ft long cuttings were planted 10 in deep and 6 ft long cuttings were planted 5 ft deep in the plot soil. For 1 ft cuttings, roots grew primarily with the top 45 cm (18 in) of soil, though there were several thin roots that grew down 6 ft into the soil.

The 6 ft cuttings developed roots the entire buried 1.5 m (5 ft) length. An average of 20 primary lateral roots with secondary roots developed from the deep-planted cutting at depths four to five feet below the soil surface. The mass ratio of root/stem for both the 1 ft and 5 ft cuttings averaged 0.59.

The in-field rooting success corroborate a greenhouse experiment which demonstrated that adventitious rooting occurred the entire planting length of a popular cutting. The greenhouse experiment using 4 ft deep growing chambers allowed control of root submergence by a near-surface water table. The plexiglass wall of the 1.2 m (4 ft) deep planters permitted observation of the root development during a six month period.

Roots developed the entire planted depth within two weeks of planting. Water table submergence did reduce root growth but did not kill them nor halt their apparent functions of nutrient and water uptake during the 105 day greenhouse test period. The bulk of the root mass occurred at the interface of the saturated and vadose zones in the soil profile. Roots grew most vigorously in a zone 20 cm (8 in) above and below the water table.

Stem Growth

During the 1988 growing season, the mean tree mass for 1 ft cutting plots was estimated at 39 gm for the entire population based on ten trees sampled by measuring base diameter and height. The mean tree mass for the 5 ft cutting plot was estimated at 138.6 gm using the same technique.

The date Apr. 10, 1989 was used as the beginning date for the 1989 growing season. The 1989 biomass growth rate was estimated using whole trees harvested from interior rows of plots on Jul. 7, Sep. 6 and Sep. 28, 1989.

There is no statistically significant difference ($p>0.1$) between the 1 ft and 5 ft cutting growth rate for the second growing season. There is a significant difference ($p<0.05$) between the growth rate intercepts, which indicate that the 1 ft cuttings started the second growing season significantly smaller than the 5 ft cuttings.

The overall average growth rate is estimated to be 5.4 grams stem dry matter growth per day. The leaf/stem ratio averages 0.30 for combined samples from 1 ft and 5 ft cuttings. For every pound of stem grown in the second growing season, approximately 0.30 pounds of leaf is produced. This ratio is useful in planning the management strategy in harvesting the nitrogen and the carbon from the site.

Nitrate N in Soils

The means of the nitrate N analyses for triplicate soil samples is shown in FIG. 1. The soil samples for the 5 ft deep-rooted trees were taken from soils inside the back-filled trench. The nitrate concentration in the trench planted with the deep-rooted poplar cuttings averages a very constant 2–3 mg N/kg dry soil. The nitrate concentration profile for the 5 ft cutting plot is very significantly different ($p<0.0005$) from all other plots.

The shape of the nitrate curve for the fallow plot is characteristic of an agricultural soil growing shallow rooted plants. There is no significant difference ($p>0.1$) in the nitrate concentrate profiles between the fallow and 1 ft cutting plots.

The nitrogen concentrations below corn in the soil profile show values ranging from 10 to 35 ppm in the top four feet. There is an anomaly in the data for the low nitrate concentration average in the three-foot-deep sample; there is no research data explaining the overall concentrations in the profile. There is a very significant difference ($p<0.0005$) between this corn nitrate profile and all other plot treatments. This nitrate difference is attributed to the addition of 150 lb $NH_3N$/ac anhydrous ammonia fertilizer into the cropped soil in March 1989; application was followed by microbial nitrification to nitrate.

It is apparent that there was nitrate uptake by the tree roots the entire buried cutting depth. This nitrate removal by the deep-rooted cuttings corroborates the nitrate concentrations in piezometer samples.

Nitrate Concentrations in Piezometers

Three piezometers were installed upgrade, midplot, and downgrade of the poplar plots. There had been a severe lack of precipitation on these fields up to September 1989 rainfall events. Until these rains, the groundwater table was below the bottom of the creek drainage channel and there was no water table intersecting the 5 ft deep-rooted trenches. All piezometers water samples were pumped on Sep. 11, 18 and 27 of 1989.

FIG. 2 shows the average groundwater nitrate concentrations in triplicate samples pumped from the piezometers transecting the 5 ft cutting plot and the 1 ft cutting plot. There were no functioning lysimeters on this site, so it can only be speculated that the September rains created a wetting front that moved primarily downward through the soil profile. The nitrate in the near-surface groundwater immediately following the rainfall event reflects infiltration through the soil matrix and macrospores. There is little influence from lateral horizontal base flow below the water table. In both the downgrade fallow soils and the upgrade row-cropped soils, nitrate concentrations were higher than those measured in the 5 ft and 1 ft cutting buffers (shown in FIG. 1).

There is a very significant difference ($p<0.0005$) between the plot wells. There is very significant difference ($p<0.0005$) between the wells located midplot compared to the wells located upgrade and downgrade. The nitrogen in the upgrade wells and in upgrade cropped soils reflect both the background nitrogen in the soil and the fertilizer addition of 150 lb/N/ac. The nitrogen in the down gradient wells reflect the background nitrogen in the soil, though no fertilizer was added during the 1988 and 1989 growing seasons. Though there was some week growth on this fallow plot, there was much less plant growth and much less subsequent nitrogen uptake by plants during the 1988 and 1989 growing seasons. There is no significant difference (p<0.1) between the midpoint wells between the 1 ft and 5 ft cutting plots. There is no significant difference (p<0.1) between the upgrade and downgrade plot nitrate concentrations in the piezometers.

Nitrogen in Poplar Stem and Leaf

Figure 4:
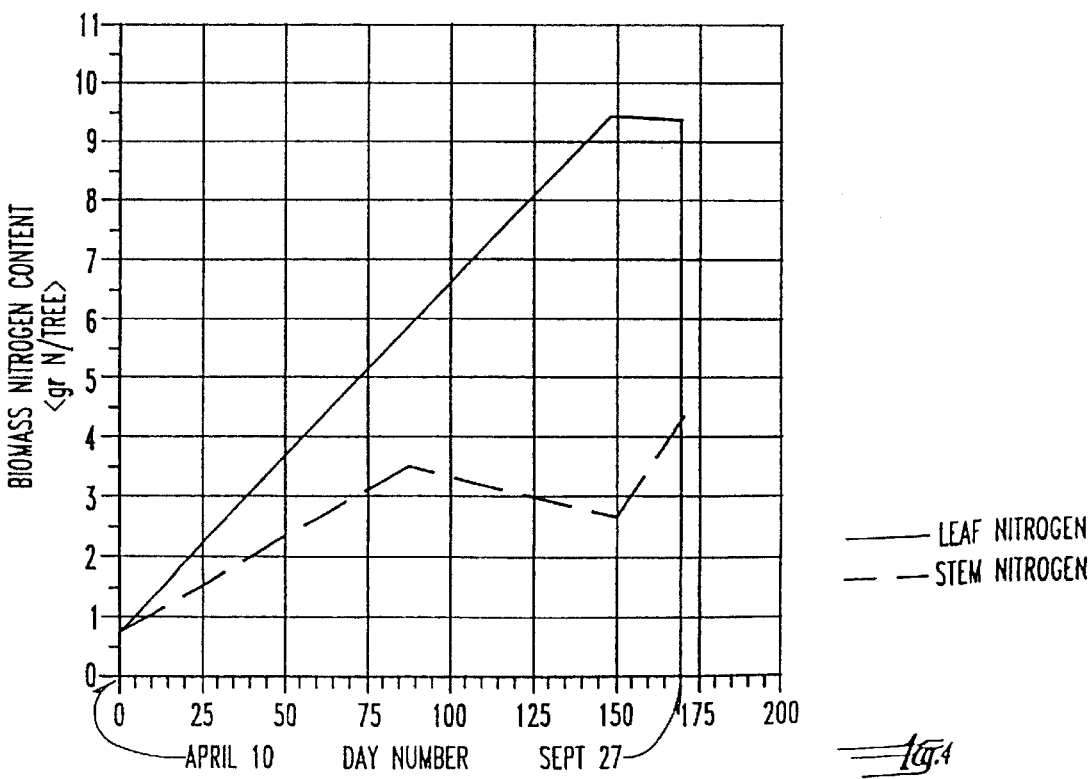
FIG. 4 is a graph showing stem and leaf nitrogen mass per tree planted with five foot stem cuttings.

The total nitrogen content in 1 ft and 5 ft rooted trees were 10.73 gm/tree and 9.37 gm/tree respectively, analyzed from triplicate samples cut Sep. 27, 1989. The estimated stem and leaf nitrogen mass uptake during the second growing season is shown for trees grown from 1 ft and 5 ft cuttings in FIGS. 3 and 4 respectively. There is no statistically significant difference (p<0.1) in the rates of nitrogen uptake between 1 ft and 5 ft cuttings.

The nitrogen measured in the plant leaf and stem was removed from the soil solution nitrogen reserve. This nitrogen concentration data for tree stem and leaf material permit a nitrogen mass uptake curve to be estimated for the 1 ft and 5 ft cutting plots. There is no statistically significant difference (p<0.1) for the stem and leaf nitrogen content between 1 ft and 5 ft cuttings.

It is noted that the leaf N concentration decreases with the progress of the growing season but the overall nitrogen content of the plant increases. The tree N content starts at 2.6% and decreases to 1.97% on a dry weight basis through the sampling period. The nitrogen concentration in the stem seems to fluctuate between 0.3% and 0.5% on a dry mass basis throughout the sampling period. Thus, it can be seen by selecting particular trees and using the planting method described, these trees form roots the entire buried length, deep into soil and are viable within and below water tables. The tree types and planting method significantly reduced nitrate nitrogen mass in the soil profile and nitrate in near surface groundwater. The nitrate was transformed into the protein and a harvested economical crop.

Thus, it can be seen the invention at least achieves its goals.

EXAMPLE 3

(Ecolotree Buffer® Principles Applied To Capping a Landfill For Closure)

Deep-rooted trees five ft long and two feet long were planted on the cap of a landfill to uptake by roots, the water infiltrating the soil cap layer. The water uptake by roots prevents further leakage of water into the filled material, reducing leachate creation. Reduced leachate creation reduces the potential of leachate contaminating surface or ground water supplies.

The fast growing poplar trees were plated densely at a rate of 1 tree/4 ft.$^2$±. Instruments collected data that demonstrated the concept that deep-rooted trees can evapotranspire water from depths greater than no cover plants or grass. An installed site measured the long-term effectiveness of a perennial root system to remove water added due to precipitation to the landfill cap during the growing season. During the dormant season, the tree planted cap was dewatered to sufficient depth such that water infiltrating through the cap first had to rehydrate the rooted soil depth.

Thus, this deep-rooted tree cap prevented the movement of pollutants be restricting the water leaking through the soil surface and entering buried sources of pollution, subsequently forming leachates which could migrate to drinking water supplies.

EXAMPLE 4

(Ecolotree Buffer® Principles Applied to Reducing Heavy Metal and Arsenic Leaching From Mine Tailings)

Deep-rooted trees were used to stabilize arsenic leaching from gold ore tailing to surface water supplies. By the uptake of water infiltrating through contaminated soils, or tailing piles, the mass of water leaching through material is reduced. This uptake of water decreases leachate creation and its potential of migrating to water supplies or uncontaminated soils.

The tree buffers were also demonstrated as a way to replant strip-mined soils where they perform the role of stabilizing soils, reducing water contamination, and reestablishing a soil/plant/animal ecosystem.

This concept is applicable to sites denuded of vegetation by mining, or other industrial activity, where the trees begin the revegetation sequence as well as reducing the mass water-leached compounds containing heavy metals leaving the disturbed site.

The examples shown above are not intended to limit the described invention in any manner but are included for demonstrative purposes only.

It is therefore seen that the present invention accomplishes at least all of the stated objectives. potential of leachate contaminating surface or ground water supplies.

The fast growing poplar trees were plated densely at a rate of 1 tree/4 ft.$^2$±. Instruments collected data that demonstrated the concept that deep-rooted trees can evapotranspire water from depths greater than no cover plants or grass. An installed site measured the long-term effectiveness of a perennial root system to remove water added due to precipitation to the landfill cap during the growing season. During the dormant season, the tree planted cap was dewatered to sufficient depth such that water infiltrating through the cap first had to rehydrate the rooted soil depth.

Thus, this deep-rooted tree cap prevented the movement of pollutants be restricting the water leaking through the soil surface and entering buried sources of pollution, subsequently forming leachates which could migrate to drinking water supplies.

EXAMPLE 4

(Ecolotree Buffer® Principles Applied to Reducing Heavy Metal and Arsenic Leaching From Mine Tailings)

Deep-rooted trees were used to stabilize arsenic leaching from gold ore tailing to surface water supplies. By the uptake of water infiltrating through contaminated soils, or tailing piles, the mass of water leaching through material is reduced. This uptake of water decreases leachate creation and its potential of migrating to water supplies or uncontaminated soils.

The tree buffers were also demonstrated as a way to replant strip-mined soils where they perform the role of stabilizing soils, reducing water contamination, and reestablishing a soil/plant/animal ecosystem.

This concept is applicable to sites denuded of vegetation by mining, or other industrial activity, where the trees begin the revegetation sequence as well as reducing the mass water-leached compounds containing heavy metals leaving the disturbed site.

The examples shown above are not intended to limit the described invention in any manner but are included for demonstrative purposes only.

It is therefore seen that the present invention accomplishes at least all of the stated objectives.

What is claimed is:

1. A method of reducing leachate from contaminated soil on landfills and brown fields, said method comprising:

planting rooted or unrooted tree stems of the Salicaceae family at a depth sufficient so that said stems intersect with enough soil to develop a root system of sufficient depth to interact with the soil to function as a sponge and pump, and allowing said stems to develop roots to remove water from the soil, thereby preventing or greatly reducing further leakage of water into contaminated material and reducing leachate creation.

2. The method of claim 1 wherein the tree stems are from trees capable of resprouting from a stump, and have fast wood growth.

3. The method of claim 1 wherein the trees are Populus spp. (poplar).

4. The method of claim 1 wherein the trees are Salix spp. (willow).

5. The method of claim 1 wherein the trees are sycamore.

6. The method of claim 1 wherein the tree stem is from one foot to about six feet in length.

7. The method of claim 1 wherein the tree stems are planted at pollutant inhibition enhancing density.

8. The method of claim 1 wherein the tree stems are planted at a density of about $3 ft^2$/tree to 40 $ft^2$/tree.

9. The method of claim 1 wherein the tree stems are planted at a density of about $3 ft^2$/tree to 30 $ft^2$/tree.

10. The method of claim 1 wherein the tree stems are planted in rows to allow farm equipment to mechanize cultivation of the trees.

11. The method of claim 1 wherein the tree stems are planted between a source of pollutant and a receiving water body.

12. The method of claim 1 wherein the trees grown from the tree stems remove pollutants selected from the group consisting of nutrient pollutants, synthetic organic chemicals, heavy metals and radioactive isotopes.

13. The method of claim 1 wherein nitrate-nitrogen and ammonia nitrogen are-removed from near surface ground water.

14. The method of claim 1 further comprising growing a tree crop from juvenile tree stems.

15. The method of claim 14 wherein the trees are thinned as necessary to maintain vigor.

16. The method of claim 1 wherein the tree stems have preformed root initials.

17. The method of claim 11 wherein the tree stems are planted adjacent to a source of airborne particles of a livestock and manure management facility.

18. A method of filtering anions, cations and organic particles from waste water comprising:

planting rooted or unrooted tree stems of the Salicaceae adjacent to a waste water source;

allowing the stems to develop roots in such a manner that the roots intercept said waste water and adsorb said anions, cations and organic particles present in the waste water.

19. The method of claim 18 wherein the tree stems have preformed root initials.

20. A method of trapping airborne particulate matter comprising:

planting rooted or unrooted tree stems of the Salicaceae family, allowing said stems to develop roots, and planting said stems adjacent to an airborne particle source so that said stems and leaves will provide sufficient surface area to intercept said airborne particulate matter such that the particles will fall or wash from said leaves and become amendment for the soil.

21. The method of claim 20 wherein the tree stems have preformed root initials.

22. A method of filtering trace anion, cation and organic compounds from sewage water comprising:

planting rooted or unrooted tree stems of the Salicaceae family adjacent to a sewage water source;

allowing the stems to develop roots in such a manner that the roots intercept said sewage water irrigated by surface or subsurface distribution systems and adsorb said anions, cations and trace organic compounds from the sewage water.

23. The method of claim 22 wherein the tree stems have preformed root initials.

24. A method of reducing leachate from contaminated soil on landfills and brown fields, said method comprising:

planting rooted or unrooted tree stems of the Salicaceae family at a depth ranging from six inches to seven feet so that said stem interacts with enough soil to develop a root system of sufficient depth to interact with the soil to function as a sponge and pump, and planting the tree stems at a density of about 3 $ft^2$/tree to 40 $ft^2$/tree; and allowing said stems to develop roots to remove water from the soil, thereby preventing or greatly reducing further leakage into contaminated material and reducing leachate creation.

25. A method of trapping airborne particulate matter comprising:

planting rooted or unrooted tree stems of the Salicaceae family at a density of about 3 $ft^2$/tree to 40 $ft^2$/tree and adjacent to an airborne particle source so that said stems and leaves will provide sufficient surface area to intercept said airborne particulate matter such that the particles will fall or wash from said leaves and become amendment for the soil.

* * * * *